(12) United States Patent
Tsuchiya et al.

(10) Patent No.: US 9,669,314 B2
(45) Date of Patent: Jun. 6, 2017

(54) INFORMATION PROCESSING APPARATUS

(75) Inventors: Akitsugu Tsuchiya, Kanagawa (JP);
Nobukazu Koyama, Tokyo (JP);
Masaki Higuchi, Tokyo (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 7 days.

(21) Appl. No.: 13/413,688

(22) Filed: Mar. 7, 2012

(65) Prior Publication Data
US 2012/0233564 A1  Sep. 13, 2012

(30) Foreign Application Priority Data

Mar. 9, 2011  (JP) .................................. 2011-052027
Mar. 9, 2011  (JP) .................................. 2011-052028

(51) Int. Cl.
*A63F 13/69* (2014.01)
*A63F 13/537* (2014.01)
(Continued)

(52) U.S. Cl.
CPC .............. *A63F 13/69* (2014.09); *A63F 13/30* (2014.09); *A63F 13/35* (2014.09); *A63F 13/537* (2014.09); *A63F 13/795* (2014.09); *G07F 17/3225* (2013.01); *A63F 2300/207* (2013.01); *A63F 2300/405* (2013.01); *A63F 2300/406* (2013.01); *A63F 2300/407* (2013.01); *A63F 2300/534* (2013.01); *A63F 2300/556* (2013.01); *A63F 2300/558* (2013.01);
(Continued)

(58) Field of Classification Search
CPC .............. D06F 39/005; A63F 2300/556; A63F 2300/558; A63F 13/35; A63F 13/12; A63F 13/87; A63F 2300/407; A63F 13/69; A63F 13/537; A63F 13/30; A63F 13/795; G07F 17/32; G07F 17/3225
USPC ......................................................... 715/772
See application file for complete search history.

(56) References Cited

U.S. PATENT DOCUMENTS 6,268,879 B1    7/2001  Sato
6,821,205 B2 *  11/2004 Takahashi et al. ............. 463/42
(Continued)

FOREIGN PATENT DOCUMENTS

JP   2009297467 A   12/2009
JP   2010005255 A    1/2010
(Continued)

OTHER PUBLICATIONS

"John Resig—Offline Event" posted on Feb. 16, 2007, downloaded from ejohn.org/blog/offline-events/, 8 pages.*
(Continued)

*Primary Examiner* — Jaime Duckworth
(74) *Attorney, Agent, or Firm* — Matthew B. Dernier, Esq.

(57) ABSTRACT

A mode setting unit sets either a first mode or a second mode. When the first mode is set, the item information acquiring unit acquires item acquisition information stored in an external server via a communication unit. On the other hand, when the second mode is set, the item information acquiring unit acquires the item acquisition information from a storage. A display processing unit displays on a display unit an item acquisition status using the item acquisition information acquired by the item information acquiring unit.

5 Claims, 13 Drawing Sheets

(51) Int. Cl.
*A63F 13/795* (2014.01)
*A63F 13/30* (2014.01)
*G07F 17/32* (2006.01)
*A63F 13/35* (2014.01)

(52) U.S. Cl.
CPC . *A63F 2300/5546* (2013.01); *A63F 2300/609* (2013.01); *A63F 2300/61* (2013.01); *G07F 17/32* (2013.01)

(56) References Cited

U.S. PATENT DOCUMENTS

| | | | |
|---|---|---|---|
| 6,863,608 B1* | 3/2005 | LeMay et al. | 463/24 |
| 8,241,129 B2 | 8/2012 | O'Kelley, II | |
| 8,277,325 B2* | 10/2012 | Bortnik et al. | 463/43 |
| 8,535,165 B2 | 9/2013 | O'Kelley, II | |
| 2004/0087373 A1* | 5/2004 | Choi | A63F 13/12 463/42 |
| 2006/0287096 A1* | 12/2006 | O'Kelley et al. | 463/42 |
| 2007/0173327 A1 | 7/2007 | Kilgore | |
| 2007/0188647 A1 | 8/2007 | Ikeda | |
| 2008/0090662 A1* | 4/2008 | Verardi et al. | 463/42 |
| 2009/0027565 A1 | 1/2009 | Dorsey | |
| 2009/0222537 A1* | 9/2009 | Watkins et al. | 709/221 |
| 2010/0134432 A1 | 6/2010 | Seo | |
| 2010/0289739 A1 | 11/2010 | Tamura | |
| 2011/0045912 A1* | 2/2011 | Bortnik et al. | 463/42 |
| 2011/0053693 A1* | 3/2011 | Wright | 463/42 |
| 2011/0105232 A1* | 5/2011 | Godfrey | A63F 13/12 463/42 |
| 2012/0283023 A1 | 11/2012 | O'Kelley, II | |

FOREIGN PATENT DOCUMENTS

| | | |
|---|---|---|
| JP | 2010264151 A | 11/2010 |
| KR | 20080017327 | 2/2008 |

OTHER PUBLICATIONS

Examination Report issued for corresponding Australian Patent Application No. 2012201403, dated Feb. 26, 2013.
Office Action issued for corresponding Japanese Patent Application No. 2011-052028, dated Mar. 5, 2013.
European Search Report for corresponding European Patent Application No. 12158293, dated Jul. 18, 2013.
Harry Mccracken: "Gears of War—The new Google product that could augur the death of Microsoft", URL: http://www.slate.com/articles/technology/technology/2007/06/gears_of_war.single.html (Jun. 15, 2007).
"Open Feint, Game Center Integration Tips for i OS" URL:http://web.archive.org/web/20101231030641/http://www.mindthecube.com/blog/2010/12/adding-openfeint-and-game-center-to-unity-ios-project (Dec. 31, 2010).
Office Action issued for corresponding Japanese Patent Application No. 2011-052028, dated Jul. 2, 2013.
Office Action issued for corresponding Korean Patent Application No. 10-2012-0023201, dated Jul. 25, 2013.
Office Action issued for corresponding Russian Patent Application No. 2012108428/08 (012738), dated Jul. 30, 2013.

* cited by examiner

FIG.6

| MISSION (REQUIREMENT FOR GAME PLAY) | ITEM ID |
|---|---|
| RANK FIRST IN INTERNATIONAL GRAND PRIX | 1 |
| ATTAIN FIRST PLACE WITH A HUGE LEAD | 2 |
| RANK FIRST IN ALL CLASSES | 3 |
| ⋮ | ⋮ |

FIG.7

| ITEM ID | FLAG |
|---------|------|
| 0 | 0 |
| 1 | 1 |
| 2 | 0 |
| 3 | 1 |
| ⋮ | ⋮ |

INFORMATION PROCESSING APPARATUS

BACKGROUND OF THE INVENTION

1. Field of the Invention

The present invention relates to an information processing technique implemented by an information processing apparatus such as a game device.

2. Description of the Related Art

In recent years, a wide variety of game software is available on the market. One method for motivating users to continue playing a game is conceivable where a user is awarded by some sort of prize in accordance with the level of achievement when he/she accomplishes a mission in the game. In this case, the game itself attracts the user all the more and gives added meaning to completing a game play if the fulfillment level in the total of various types of games can be presented to the user and the fulfillment level can be competed against other users, instead of the prize simply awarded for the achievement in a given space or world of a single closed game. For these reasons, proposed is a fulfillment level managing system that derives a user level by points earned by him/her according as how well the user has acquired item(s) when the mission is fulfilled (see Reference (1) in the following Related Art List, for instance).

RELATED ART LIST (1) Japanese Unexamined Patent Application Publication (Kokai) No. 2010-5255.

With the spread of constant Internet connectivity, a stationary game device can acquire information concerning the acquisition of items by accessing an external server when necessary. However, there are cases where a portable game device cannot access the external server depending on a communication environment. Particularly, a game device having a function of wireless LAN communication cannot access the external server unless there is an access point in the vicinity. Accordingly, how to present the item(s) that the user has acquired is a problem to be solved in a game device that may face the situations where the user has no access to the external server.

In some cases, the portable game device is structured such that it is provided with a built-in type recording medium and, additionally, an insertable recording medium can be loaded into the game device. The recording capacity of the built-in type recording medium is relatively small in general, so that the efficient use of the built-in type recording medium is desired.

SUMMARY OF THE INVENTION

A purpose of the present invention is therefore to provide a technology for efficiently presenting information concerning the earned items to the users.

In order to resolve the aforementioned problems, an information processing apparatus according to one embodiment of the present invention includes: a mode setting unit configured to set a display mode that is either a first mode or a second mode; a communication unit connected to an external server; a recording medium for recording acquisition information on an item, the item being acquired because a condition set by an application has been fulfilled; an acquisition unit configured to acquire the item acquisition information; and a display processing unit configured to display on a display unit an item acquisition status using the item acquisition information acquired by the acquisition unit, wherein when the first mode is set, the acquisition unit acquires the item acquisition information stored in the external server via the communication unit, and wherein when the second mode is set, the acquisition unit acquires the item acquisition information from the recording medium.

Optional combinations of the aforementioned constituting elements, and implementations of the invention in the form of methods, apparatuses, systems, recording media, computer programs, and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which:

FIG. 6 shows an exemplary relation between the content of missions and item IDs;

FIG. 7 shows a trophy acquisition table;

DETAILED DESCRIPTION OF THE INVENTION

Figure 1:
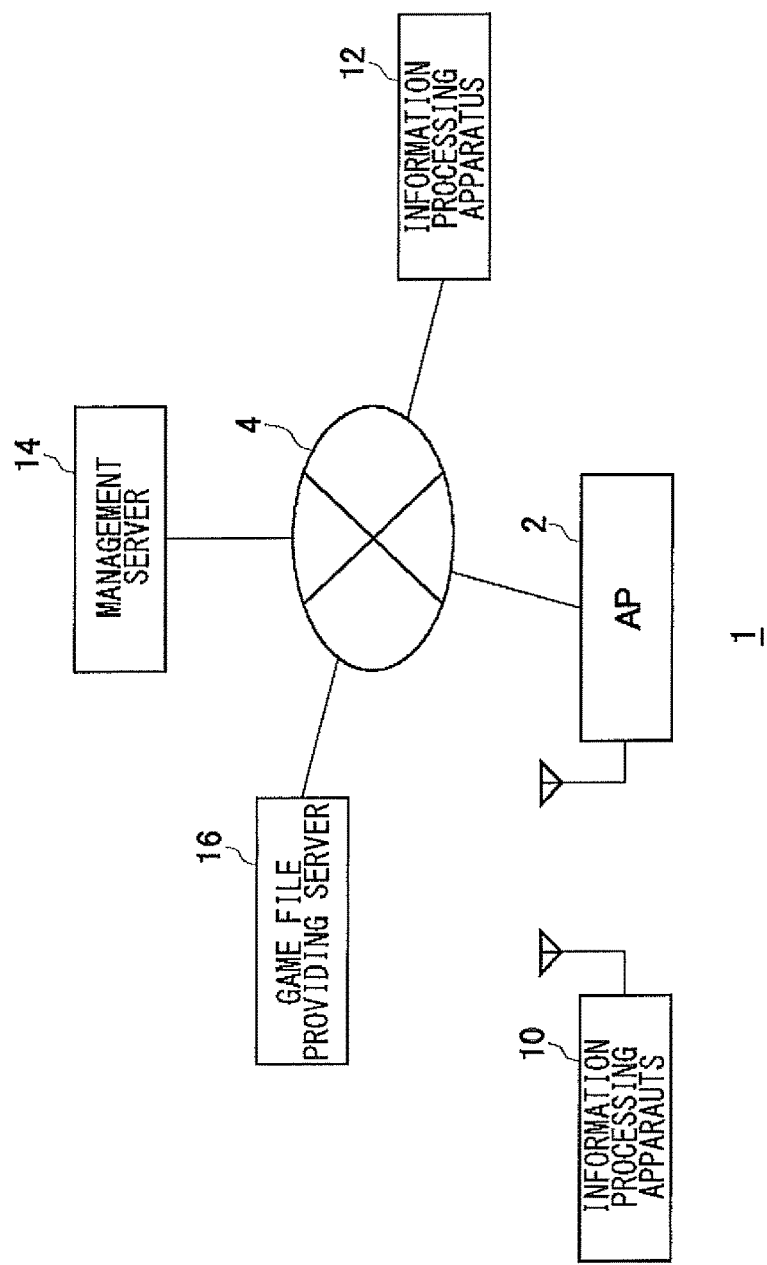
FIG. 1 shows an information processing system according to an exemplary embodiment of the present invention.

The invention will now be described by reference to the preferred embodiments. This does not intend to limit the scope of the present invention, but to exemplify the invention.

A description is first given of a background and an outline of the present invention. A game system which is an example of an information processing system is now explained as an exemplary embodiment of the present invention. If, in the game system, a user clears a requirement or a given condition (mission), which has been preset by a game software, while he/she is playing a game, an item suitable for an achieved requirement is awarded to the user by the game software. The missions are set, as appropriate, by the game software. Such a mission to be cleared may include a victory in a special race in a racing game, beating a particular enemy character in a fight game, and so forth.

In the present exemplary embodiment, an item to be given to the user is called a "trophy". A plurality of kinds of trophies are available and, for example, four grades (types) of trophies, which are a bronze, a silver, a gold, and a platinum trophy, are prepared in the present exemplary embodiment. The game software assigns the bronze, the silver, and the gold grades to a mission so that the difficulty level of mission increases in this order. Accordingly, a mission that can be easily achieved or fulfilled is assigned to the bronze trophy, and a mission rather difficult to be achieved is assigned to the gold trophy. It is to be noted here that the platinum trophy is not awarded to individual missions appearing in a game but is awarded by the system software when all the missions prepared by the game software are cleared, for instance.

With the development of the communication network in the recent years, it is generally practiced that a stationary game device in particular is constantly connected to the network via a router provided at home. Where a management server on the network provides a service in which the trophies earned by the user who has signed in can be viewed, the user can compare the trophies earned by himself/herself with those earned by other users when his/her game device accesses the management server. The management server manages the trophies acquired by the user. If, for example, a user plays a game using a plurality of game devices, the trophies earned by the respective game devices will be gathered together and the trophy acquisition information for the respective game devices is synchronized (file-synchronized). Also, points are set for each trophy type, so that the game player's skill level can be raised by gaining the total number of points earned.

If, on the other hand, no access point is available in the vicinity, the portable game device cannot be connected to the network. In the information processing system according to the present exemplary embodiment, the user can acquire trophies through a game play even in an environment where the game device is not connected to the network. However, the trophy acquisition information cannot be synchronized unless the game device can access the management server. Since there are cases where the user wishes to confirm the trophies acquired by the game device, the game device presents the acquired trophies as much as possible.

FIG. 1 shows an information processing system 1 according to an exemplary embodiment of the present invention. The information processing system 1 includes a first information processing apparatus 10 and a second information processing apparatus 12, which are both user terminals, a management server 14, and a game file providing server 16. In the present exemplary embodiment, the information processing apparatus 10 is a portable (mobile) game device that executes game programs, whereas the second information processing apparatus 12 is a stationary game device that executes game programs. The information processing apparatuses 10 and 12 may each be a game dedicated device but each may also be a computer operating as a game device where an emulator is installed.

The game file providing server 16 provides game files. A game file includes a boot file, a group of files for executing a game such as a game program, and a group of files to be used by the system software or applications of the information processing apparatuses 10 and 12. The game program is a program necessary for the execution of a game, and the game progresses as the game program is run. The boot file is a program for starting the game program, and the game program is called out and executed as the system software executes the boot file. The group of files to be used by the system software or applications includes, for instance, game icon image data to be displayed on a menu screen of the information processing apparatus 10, image data of trophies and the like.

The management server 14 is operated by an entity that manages the trophies. The management server 14 manages the trophies that the user has acquired in the game, and provides a trophy browsing service. If, in the information processing system 1, the user clears a requirement (mission), which has been preset by a game software, while he/she is playing a game, an item suitable for the requirement is given to the user. The user's trophy acquisition information is recorded in the information processing apparatuses 10 and 12. If the information processing apparatuses 10 and 12 sign in to the trophy browsing service, the trophy acquisition information will be simultaneously sent to the management server 14 and stored therein. The management server 14 accumulates the trophy acquisition information for each user, based on account IDs with which to identify the users on the network. For example, if a single user plays on a plurality of information processing apparatuses 10 and 12 and if it is actually found that their account IDs are identical to each other, the management server 14 will merge new trophy acquisition information into the trophy acquisition information accumulated in the past so as to gather or aggregate them into organized data. At the same time, the management server 14 transmits the merged trophy acquisition information to a plurality of information processing apparatuses 10 and 12 that have already signed in thereto, so that the trophy acquisition information is synchronized between each of the information processing apparatus 10 and 12 and the management server 14.

The information processing apparatus 10, which has a wireless communication function, connects to a network 4 via an access point (hereinafter referred to as "AP") 2 and transmits the trophy acquisition information to the management server 14 so as to acquire the synchronization information on the trophies from the management server 14. The AP 2 functions as a relay unit that connects the information processing apparatus 10 to another access point by wireless LAN (Local Area Network) or connects the information processing apparatus 10 to the network 4. As described above, the information processing apparatus 10 may have a communication function by wireless LAN but the information processing apparatus 10 may also transmit the trophy acquisition information to the management server 14 and receive the synchronization information on the trophy by connecting to a mobile telephone network using a mobile telephone communication scheme such as the third-generation mobile communication system.

The information processing apparatus 12 connects to the network 4 via the router, transmits the trophy acquisition information to the management server 14, and acquires the trophy synchronization information from the management server 14. As already described above, the information processing apparatus 12 may be a stationary game device but may be a mobile game device like the information processing apparatus 10.

Figure 2:
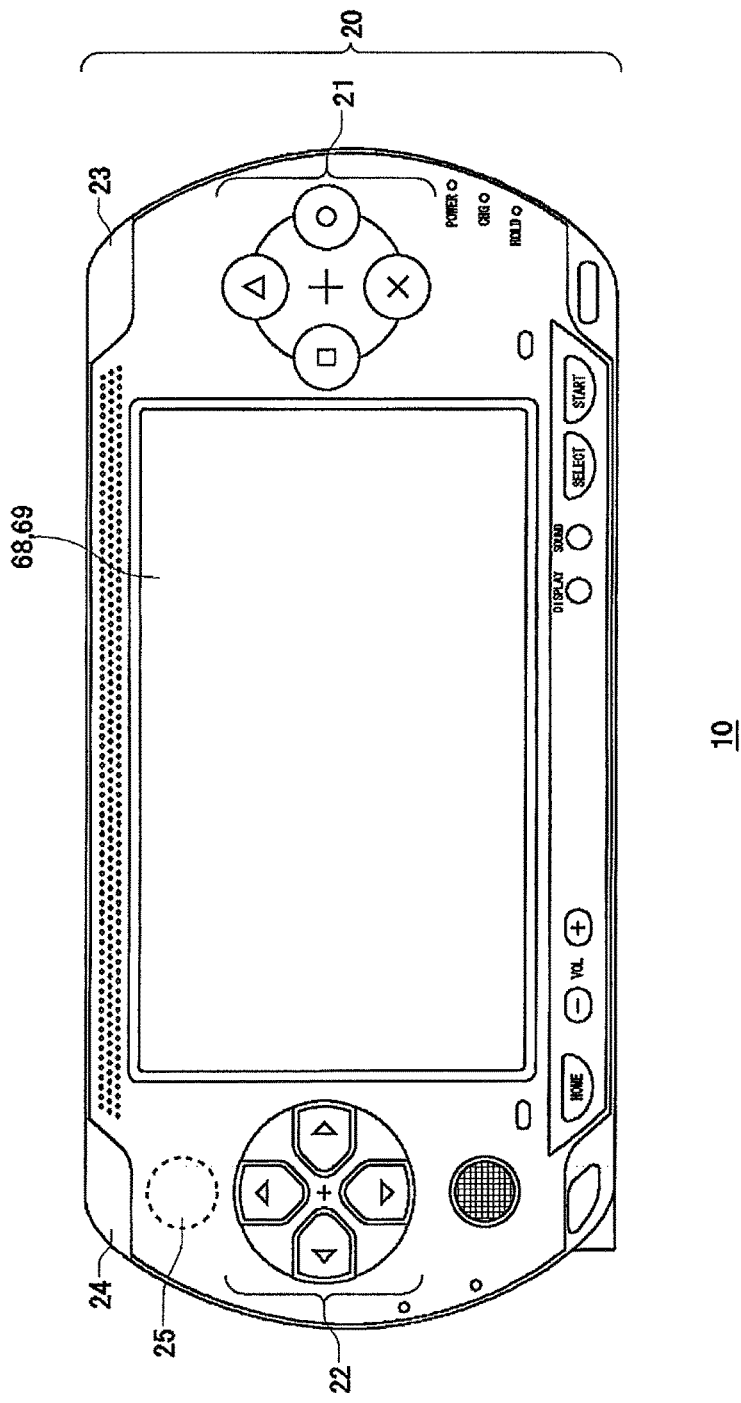
FIG. 2 shows an example of the appearance of an information processing apparatus according to an exemplary embodiment of the present invention.

FIG. 2 shows an example of the appearance of the information processing apparatus 10 according to an exemplary embodiment of the present invention. The information processing apparatus 10 shown in FIG. 2 is a mobile terminal equipped with a wireless communication function. Also, it should be appreciated that the information processing apparatus 10 may be connected to the network 4 via cable and it may be a stationary terminal, instead of a mobile terminal.

As shown in FIG. 2, input devices 20, such as instruction input buttons 21, direction keys 22, an R button 23, and an L button 24, and a display device 68 are provided on the front side of the information processing apparatus 10, which is the side thereof facing the user who holds and operates it. The display device 68 is also provided with a touch panel 69 that detects contact by a finger of the user or a stylus pen or the like. Provided inside the information processing apparatus 10 is a motion sensor 25 capable of detecting the inclination of the information processing apparatus 10. It should be noted also that the information processing apparatus 10 may be provided with a back touch panel on the back side thereof.

Provided in a lateral side of the information processing apparatus 10 is a receiving section, such as a slot (not shown), for receiving a recording medium like a memory card. Also provided in a lateral side of the information processing apparatus 10 is a receiving section, such as a slot (not shown), for receiving a recording medium which has a game file recorded thereon.

The user, while holding the information processing apparatus 10 with both hands, can operate the instruction input buttons 21 with the thumb of the right hand, the direction keys 22 with the thumb of the left hand, the R button 23 with the index finger or the middle finger of the right hand, and the L button 24 with the index finger or the middle finger of the left hand, for instance. Also, when operating the touch panel 69, the user may hold the information processing apparatus 10 with both hands and operate the touch panel 69 with the thumbs of both hands, or may hold the information processing apparatus 10 with the left hand and operate the touch panel 69 with the right hand, the direction keys 22 with the thumb of the left hand, and the L button 24 with the index finger or the middle finger of the left hand.

Figure 3:
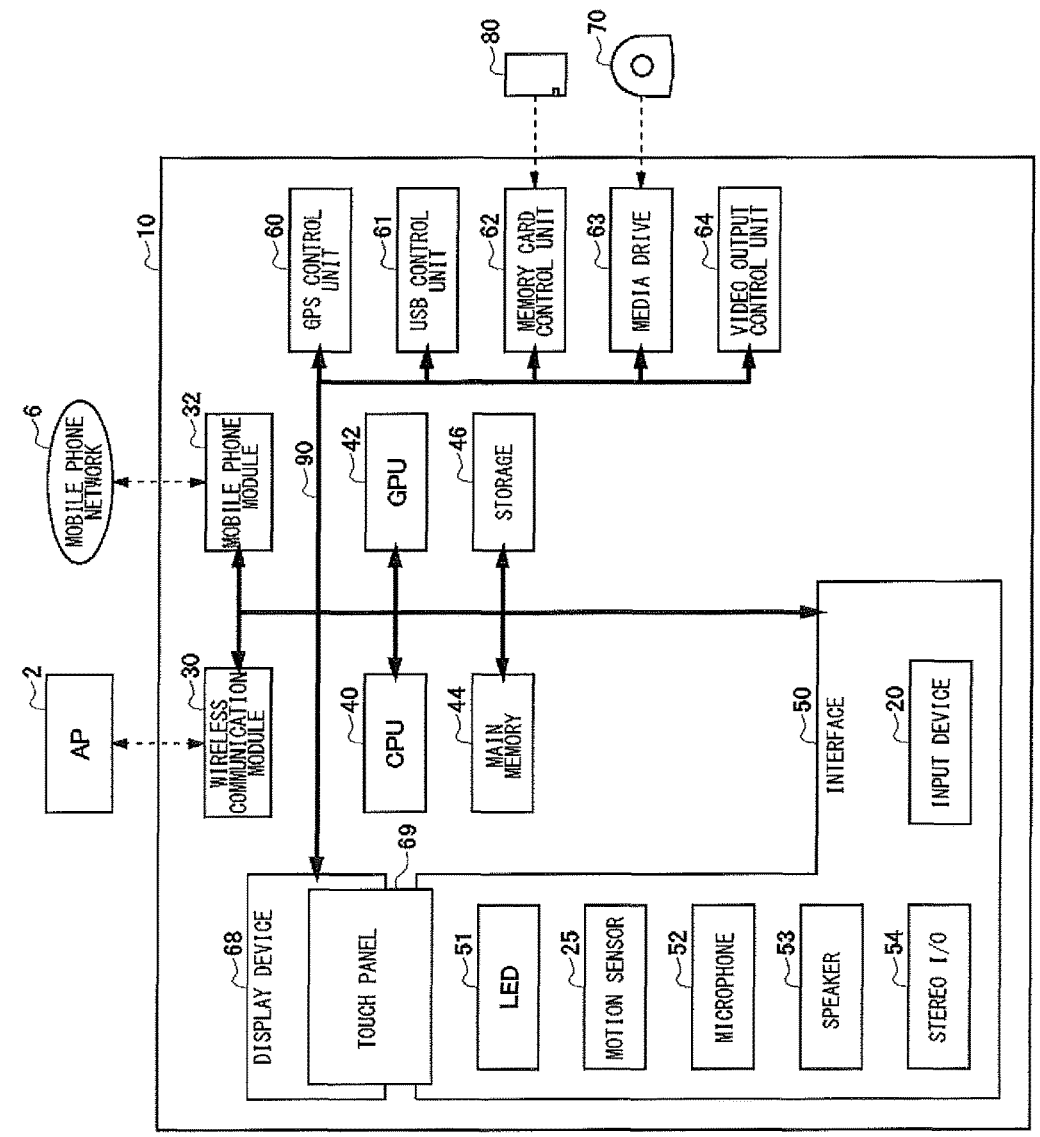
FIG. 3 is a diagram showing functional blocks of an information processing apparatus.

FIG. 3 shows functional blocks of the information processing apparatus 10. The display device 68 display images generated by the respective functions of the information processing apparatus 10. The display device 68 may be a liquid crystal display device or an organic EL display device. The touch panel 69 is so provided as to be superimposed on the display device 68, and detects the touch or contact of a user's finger, pen or the like. The touch panel 69 may implement any of a resistive overlay method, a surface electrostatic capacitive method, a projected electrostatic capacitive method, and the like. In the information processing apparatus 10, the display is comprised of the display device 68 and the touch panel 69.

A wireless communication module 30 is constituted by a wireless LAN module compliant with a communication standard such as IEEE 802.11b/g, and connects to the network 4 via the AP 2. The wireless communication module 30 may communicate directly with the other information processing apparatus 10 in ad-hoc mode. A mobile telephone module 32 is compatible with a third-generation digital mobile telephone scheme compliant with the international mobile telecommunication 2000 (IMT-2000) standard prescribed by the International Telecommunication Union (ITU), and the mobile telephone module 32 connects to a mobile telephone network 6. A subscriber identity module (SIM) card, in which a unique ID number to identify a telephone number of a mobile telephone has been recorded, is inserted to the mobile telephone module 32.

In an interface 50, an LED (light emitting diode) 51 blinks while the wireless communication module 30, the mobile telephone module 32, and the like transmit and receive data. A motion sensor 25 detects the movement of the information processing apparatus 10. A microphone 52 inputs sound surrounding the information processing apparatus 10. A speaker 53 outputs audio generated by the respective functions of the information processing apparatus 10. A stereo input/output terminal 54 receives the input of stereo audio from an external microphone, and outputs the stereo audio to an external headphone or the like. The input device 20 includes the aforementioned operation keys and the like and receives the input of a user's operation.

A CPU (central processing unit) 40 executes programs and the like loaded in main memory 44. A GPU (graphics processing unit) 42 performs computations necessary for the image processing. The main memory 44 is comprised of RAM (random access memory) and the like, and stores programs, data, and so forth that run and operate in the information processing apparatus 10. A storage 46 is comprised of NAND-type flash memory and the like, and stores programs, data, and so forth. The storage 46 is used as a built-in type auxiliary storage for a recording medium 80 (described later).

A GPS (global positioning system) control unit 60 receives signals from GPS satellites and computes the present position. A USB control unit 61 controls communications between peripheral devices connected via USBs (universal serial buses). A video output control unit 64 outputs video signals to an external display device, based on a standard such as HDMI (high definition multimedia interface). A memory card control unit 62 controls read and write of data between the recording media 80 such as flash memories and the like inserted into the receiving section (not shown), such as a slot. As the removable recording medium 80 is inserted into the receiving section, the recording medium 80 is used as an external auxiliary storage. A media drive 63 is a receiving section in which a game recording medium 70 that has recorded game files is loaded, and the media drive 63 controls read and write of data between the game recording media 70. Note that the game file recorded in the game recording medium 70 has the same file composition as that of the game file transmitted from the game file providing server 16. The media drive 63 drives the game recording medium 70, so that the user can play games recorded in the game recording medium 70. The above-described respective functional blocks are connected to each other by a bus 90.

The information processing apparatus 10 according to the present exemplary embodiment can install game files in the recording medium 80 by downloading the game files from the game file providing server 16. In this manner, the information processing apparatus 10 has a function of executing the game files recorded in the game recording medium 70 and those installed in the recording medium 80.

The processing function of the information processing apparatus 10 described in the present exemplary embodiment is applicable to not only the information processing apparatus for executing game applications but also that for executing other applications. The information processing apparatus 10 executes system software, game software, and item management utility. A description is given hereunder of processing functions of the information processing apparatus 10 realized by the system software, the game software and the item management utility.

When the fulfillment of a preset play condition of a game is detected during the progress of the game played by the user, the game software calls the item management utility installed in the information processing apparatus 10 and then gives an item (trophy) to the user.

At the initial starting of the game software, the item management utility creates a trophy acquisition table in the storage 46, which is a built-in type recording medium, in the information processing apparatus 10. This table indicates the IDs of all trophies prepared by the game software and the acquired flag values by which whether a trophy is earned or not is indicated. In the default state, the acquired flag values are set to "0". The game software passes the ID of a trophy corresponding to the fulfilled condition to the item management utility. Upon receipt of the trophy ID, the item management utility references the acquired flag value of the corresponding trophy ID and then does nothing if the flag value is "1" or sets the flag value to "1" if it is "0". When the acquired flag value of a trophy ID is set to "1", this trophy ID constitutes the trophy acquisition information. Thus, every time the game software detects the fulfillment of a preset condition, the trophy acquisition table is updated, thereby increasing the amount of trophy acquisition information.

The item management utility transmits the trophy acquisition information to the management server 14. Based on the user's account ID, the management server 14 merges new trophy acquisition information into the trophy acquisition information accumulated in the past so as to accumulate them.

Also, the item management utility receives the trophy synchronization information from the management server 14. For example, when the user plays a game, with different timings, using the information processing apparatuses 10 and 12, the information on a trophy earned through either one of the information processing apparatuses 10 and 12 is sent to the other information processing apparatus 12 or 10 via the management server 14. As a result, the trophy acquisition information is synchronized by a plurality of information processing apparatuses 10 and 12 and the management server 14. Here, synchronization means that the trophy acquisition information stored in a plurality of information processing apparatuses is kept in the same condition, e.g., in the most recent and updated state.

Figure 4:
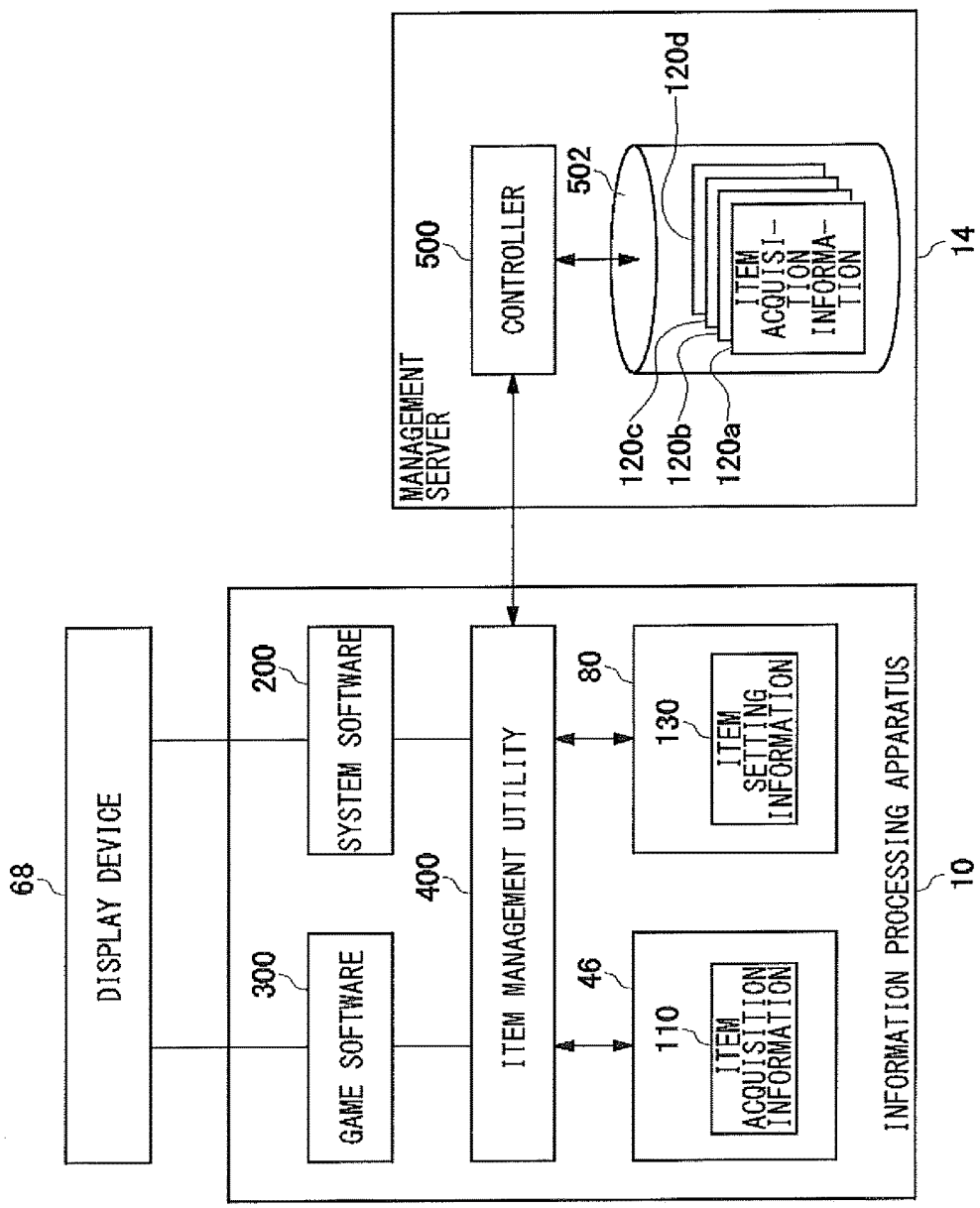
FIG. 4 is a diagram showing functional blocks of an information processing system that performs a process for managing items (trophies)

FIG. 4 is a diagram showing functional blocks of the information processing system 1 that performs a process for managing items (trophies). The information processing apparatus 10 executes system software 200, game software 300, and item management utility software (hereinafter referred to as an "item management utility") 400. The system software 200 is an operating system (OS) and has a functional capability of performing a display processing or the like in the information processing apparatus 10. The item management utility 400 provides a function regarding the management of items (trophies) to the game software 300. The item management utility 400 performs the processing of installing item setting information 130, the processing of generating item acquisition information 110, and the processing of acquiring item acquisition information 120a from the management server 14.

The management server 14 includes a controller 500 and a storage device 502. Item acquisition information 120a to 120d is stored in the storage device 502 in a manner such that, for each game, the item acquisition information 120a to 120d is bound to (associated with) a user account ID. Here, the item acquisition information 120a to 120d is bounded to the same user account ID and is therefore valid for a plurality of games played by the information processing apparatus 10 and the information processing apparatus 12. Although shown here is the item acquisition information 120a to 120d bound to a single user account ID only, the item acquisition information 120 bound to other user account IDs are, in effect, recorded in the storage device 502 as well.

<Process for Registering the Trophies>

The game software 300 calls a "trophy registration function" from the item management utility 400 at the time the game software 300 is started. The trophy registration function references the item setting information 130 and generates, in the storage 46, a table that associates a plurality of item IDs with acquired flag values indicating that items are not acquired. As a result, the game software 300 is now set to a mode where the trophies can be acquired. This processing of generating the table may be performed at the initial start of the game software 300. The trophy registration function may be performed as follows. That is, whether the table has been created in the storage 46 or not is verified at the time of staring the game software 300. And if the table is not created, the table will be created; if the table has been created, the processing of creating the table will be terminated.

Also, the trophy registration function retrieves the item setting information 130 from a predetermined file included in a game file recorded in the game recording medium 70 or the recording medium 80 (hereinafter this file will be referred to as "item file") and installs the retrieved information in the insertable recording medium 80. The processing of installing the item setting information 130 is performed every time the game software 300 is started. At the start-up of the game software 300, the trophy registration function first verifies whether the item setting information 130 is installed in the recording medium 80 or not. If the item setting information 130 is not installed in the recording medium 80, the trophy registration function will retrieve the item setting information 130 from the game file and install the item setting information 130 in the recording medium 80. If, on the other hand, it is verified that the item setting information 130 is installed in the recording medium 80, the trophy registration function will stop the install processing without retrieving the item setting information 130 from the game file. Thus, once the item setting information 130 is installed in the recording medium 80 at the initial start-up of the game software 300, the item setting information 130 will have already been installed in the recording medium 80 at the subsequent start-ups. Hence, in this case, the trophy registration function terminates the install processing without installing the item setting information 130 again.

When, for example, the recording medium 80 is changed, namely when the recording medium 80 is replaced by a new recording medium 80, the item setting information 130 is not installed in the new recording medium 80. In such a case, as the game software 300 is started after the replacement of the recording medium 80, the trophy registration function verifies that the item setting information 130 is not installed in the newly installed recording medium 80, then retrieves the item setting information 130 from the game file, and installs it in the recording medium 80.

In this process, if the user has signed in to the trophy browsing service, the trophy registration function will check the item acquisition information on games that have been executed by the information processing apparatus 10, in the item acquisition information 120a to 120d bound to the user's account ID in the management server 14.

Assume herein that the a game entitled "ABC TENNIS" only is played in the past in the information processing apparatus 10. Thus, the item acquisition information 110 stored in the storage 46 is the information with which to identify an item or items acquired in the game entitled "ABC TENNIS".

Assume also that games entitled "ABC TENNIS", "XYZ BASEBALL", "SOCCER 6" and "FISHING 2" are being played by the same user in the information processing apparatus 12. In order to synchronize the item acquisition information of each game between the information processing apparatus 12 and the management server 14, the item acquisition information regarding the games entitled "ABC TENNIS", "XYZ BASEBALL", "SOCCER 6" and "FISHING 2" are recorded in the management server 14. In the storage device 502, the item acquisition information 120a is the information with which to identify an item acquired in the game entitled "ABC TENNIS". Similarly, the item acquisition information 120b is the information with which to identify an item acquired in the game entitled "XYZ BASEBALL. Also, the item acquisition information 120c is the information with which to identify an item acquired in the game entitled "SOCCER 6", and the item acquisition information 120d is the information with which to identify an item acquired in the game entitled "FISHING 2".

Thus, if the item acquisition information 120a on the game entitled "ABC TENNIS" contains a trophy other than the trophies identified by the item acquisition information 110 stored in the storage 46, the trophy registration function of the information processing apparatus 10 will acquire said item acquisition information 120a and store it additionally in the storage 46. In this case, the trophy registration function acquires the difference between the item acquisition information 110 and the item acquisition information 120a, so that the amount of data to be transferred can be reduced.

The item setting information 130 includes an attribute such as an image indicating each trophy (trophy image) and the name and descriptive text for each trophy. The item setting information 130 is recorded in a single item file and is included in the software recorded in the recording medium 80 or game recording medium 70. Each trophy has the following attributes (1) to (4).
(1) Trophy ID:
The trophy ID is the ID with which to identify a trophy.
(2) Name/Detailed Information:
The name/detail information is the name and its descriptive text for a trophy.
(3) Grade (Type)
The grade (type) is that to specify any one of bronze, silver, gold, and platinum.
(4) Platinum Link:
The platinum link indicates whether the acquisition of a trophy meets or is contained in a requirement for the acquisition of a platinum trophy or not.

If a plurality of trophies are included in the item setting information 130, a set of the above-described attributes (1) to (4) and a trophy image will be prepared for each of the number of trophies offered. It is appreciated that four kinds of trophies images may be prepared for each grade (type).

The system software 200 generates a screen indicating a trophy acquisition status, for instance, by the use of the item setting information 130 and the item acquisition information 110 supplied from the item management utility 400. The system software 200 also generates a display screen of the display device 68 by the use of a GUI (graphical user interface).

Figure 5:
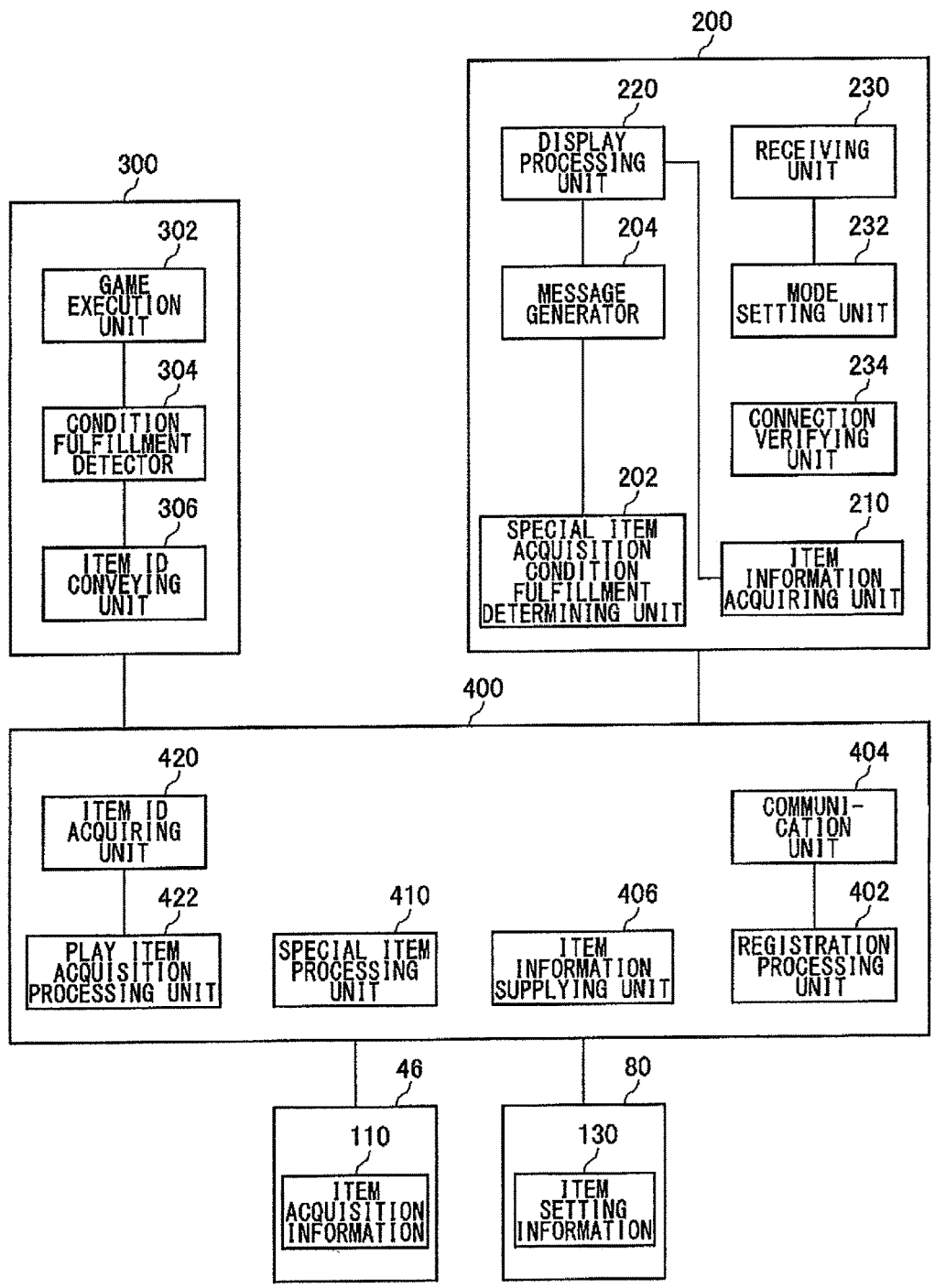
FIG. 5 is a diagram showing functional blocks by which a trophy acquisition function of an information processing apparatus is achieved.

A description is given hereunder of a trophy acquisition function of the information processing apparatus 10. FIG. 5 is a diagram showing functional blocks by which the trophy acquisition function of the information processing apparatus 10 is achieved. The trophy acquisition function is achieved by the system software 200, the game software 300, and the item management utility 400.

The system software 200, which operates as an operating system (OS), includes a special item acquisition condition fulfillment determining unit 202, a message generator 204, an item information acquiring unit 210, a display processing unit 220, a receiving unit 230, a mode setting unit 232, and a connection verifying unit 234. The game software 300 includes a game execution unit 302, a condition fulfillment detector 304, and an item ID conveying unit 306. The item management utility 400 includes a registration processing unit 402, a communication unit 404, an item information supplying unit 406, a special item processing unit 410, an item ID acquiring unit 420, and a play item acquisition processing unit 422.

In FIG. 5, the structural components described as functional blocks that perform various processings may be implemented hardwarewise by elements such as a CPU (Central Processing Unit), memory and other LSIs, and softwarewise by memory-loaded programs or the like. Therefore, it will be obvious to those skilled in the art that the functional blocks may be implemented by a variety of manners including hardware only, software only or a combination of both and should not be considered as limiting.

The above-described trophy registration function is performed by the registration processing unit 402. At the initial start-up of a game, the registration processing unit 402 references an item file included in the game file recorded in the game recording medium 70 or the recording medium 80, and then generates a trophy acquisition table, which associates a plurality of item IDs with a flag value indicating that an item is not acquired, in the storage 46. Also, at each start-up of a game, the registration processing unit 402 verifies whether the item setting information 130 is recorded in the recording medium 80 or not, and if it is not recorded, the registration processing unit 402 will acquire the item setting information 130 included in the item file and record the acquired item setting information 130 in the recording medium 80. The item file contains at lest a plurality of item IDs with which to identify items (trophies) that the user can possibly acquire in a game and the images for those items.

The storage 46 and the recording medium 80 are storage media used as auxiliary storage devices in the information processing apparatus 10. The storage 46 is a built-in type recording medium, so that the user cannot freely remove it from the information processing apparatus 10. On the other hand, the recording medium 80 is a removable recording medium and has a larger capacity than the storage 46. In the present exemplary embodiment, the trophy acquisition table is an area in which to record the item acquisition information 110, and the item acquisition information 110 is important data to be synchronized among the information processing apparatus 10, the management server 14 and the other information processing apparatus 12. On the other hand, the item setting information 130, which includes item images required when the acquired items are to be displayed, is needed when the acquired items are to be presented to the user. And the size of item images is relatively large. In particular, the data size is large if the item images are constituted by moving images. Also, standard images for items are recorded beforehand and prepared by default in the storage 46 of the information processing apparatus 10. Thus, if no item image is included in the item setting information 130, the standard images may be used as substitutes. For these reasons, the importance of the item setting information 130 is low as compared with the item acquisition information 110.

In the information processing apparatus 10 according to the present exemplary embodiment, the recording capacity of the built-in type storage 46 is small. Thus, under a policy where the recording capacity is not to be reduced or filled up more than necessary, the registration processing unit 402 records the item acquisition information 110 in the storage 46 and records the item setting information 130 in the recording medium 80.

The registration processing unit 402 checks the item acquisition information 120a in the management server 14 via the communication unit 404 connected with the management server 14. If any of the item acquisition information 110 kept in the storage 46 is not kept in the management server 14, the registration processing unit 402 will transmit such item acquisition information 110 from the communication unit 404. Also, if the registration processing unit 402 references the list of games executed in the past in the information processing apparatus 10 and if the item acquisition information 120a of a game included in the game list is in the management server 14, the registration processing unit 402 will acquire said item acquisition information 120a. Note that the information with which to identify the games executed in the past is recorded in the storage 46. As a result, the item acquisition information 110 and the item acquisition information 120a are synchronized between the information processing apparatus 10 and the management server 14.

<Process for Acquiring the Trophies>

A process for acquiring the trophies is explained hereinbelow.

In the game software 300, the game execution unit 302 receive the input of a user's operation in the input device 20 and executes a game program. In the present exemplary embodiment, the game software 300 sets, beforehand, requirements of game play for the acquisition of a trophy. These requirements are called "missions", which may be open to public users or may not be open thereto. The ID of a trophy (item ID) which is to be awarded to the user when a mission is fulfilled is associated with each mission.

When the game software 300 detects the fulfillment of a preset play condition of a game during the progress of the game played by the user, the game software 300 calls the item management utility 400 and then conveys the item ID to the item management utility 400. This processing is coded in the game program. The content of each mission and the trophy ID (item ID) awarded to the user at the time the mission has been fulfilled are associated with each other in one-to-one correspondence. FIG. 6 shows an exemplary relation between the content of missions and the item IDs.

The condition fulfillment detector 304 detects, from the progress status of a game, that a mission has been achieved, namely, a preset play condition of the game has been fulfilled. This detection processing is hard-coded in the game program. And when the mission is achieved, the process for acquiring the item ID associated with the mission is written to the game program. Detecting the achievement of a condition corresponds to acquiring the item ID. As the condition fulfillment detector 304 detects that the play condition has been fulfilled, the game execution unit 302 displays on a game screen a message indicating that a trophy associated with the fulfilled play condition has been acquired. The item ID conveying unit 306 conveys the acquired item ID to the item management utility 400.

In the item management utility 400, the item ID acquiring unit 420 acquires the item ID informed and transfers the acquired item ID to the play item acquisition processing unit 422. The play item acquisition processing unit 422 generates item acquisition information 110, using the item ID, and then writes the thus generated item acquisition information to the trophy acquisition table. The item acquisition information 110 is the information indicating that an item has been acquired.

Figure 7:
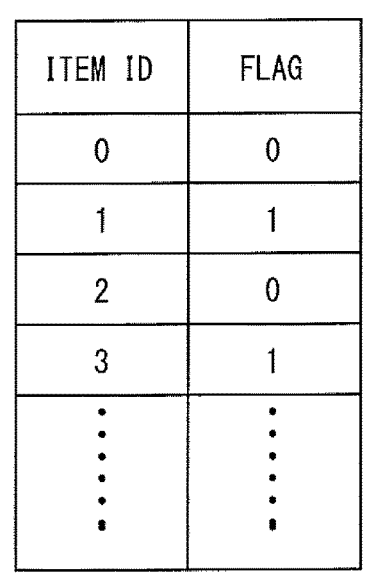

FIG. 7 shows a trophy acquisition table. The item ID and the acquired flag value indicating whether or not an item is acquired are recorded in the trophy acquisition table by associating them with each other. The acquired flag value "0" indicates that the item is not acquired, whereas the acquired flag value "1" indicates that an item is acquired.

As a mission is achieved, the acquired flag value of the item ID corresponding to the mission is set to "1". More specifically, as the play item acquisition processing unit 422 receives the item ID from the item ID acquiring unit 420, the play item acquisition processing unit 422 checks to see if the acquired flag value associated with the item ID is "1". Nothing is done if the flag value is "1", and the flag value is set to "1" if it is "0".

The items on which the play item acquisition processing unit 422 performs the acquisition process are three types of trophies which are bronze, silver, and gold trophies. Note that the platinum trophy is not included in these items. The item ID of the platinum trophy is "0", whereas "1" or above is assigned to the item IDs of the bronze, silver, and gold trophies. In this manner, the game software 300 can award three types of trophies, which are bronze, silver, and gold trophies, to the user. On the other hand, the platinum trophy is awarded to the user by the system software 200.

As the item acquisition process is performed by the play item acquisition processing unit 422, the special item acquisition condition fulfillment determining unit 202 has the special item processing unit 410 inspect the item acquisition status. The special item processing unit 410 references the item setting information 130 and the item acquisition information 110, thereby inspects the item acquisition status, and conveys the inspection results to the special item acquisition condition fulfillment determining unit 202. Based on the inspection results obtained from the special item processing unit 410, the special item acquisition condition fulfillment determining unit 202 determines whether the item acquisition condition for acquiring the special item has been achieved or not. Normally, this item acquisition condition is set for the acquisition of each of a plurality of items (trophies).

As described above, for each trophy, information on the "platinum link" is set as an attribute. The information on the platinum link is set as a flag value. That is, the flag value "1" means that the acquisition of a trophy is included in the requirement set for the acquisition of a platinum trophy, whereas the flag value 0 means that the acquisition of a trophy is not included in the requirement for the acquisition of a platinum trophy. In the item setting information 130, the flag value of the platinum link in all items is set to "1".

The special item processing unit 410 references the item setting information 130 and extracts the item IDs for which the flag value of the platinum link (hereinafter referred to as "platinum flag value" also) is set to "1". Subsequently, the special item processing unit 410 references the trophy acquisition table and inspects whether the acquisition flag values of all of the extracted item IDs are set to "1" or not.

If, among the items for which the platinum flag value is "1", there is any item that is/are not acquired, the special item processing unit 410 will convey this inspection result to the special item acquisition condition fulfillment determining unit 202. Upon receipt of the inspection result, the special item acquisition condition fulfillment determining unit 202 determines that the item acquisition condition required for the acquisition of a special item, namely a platinum trophy, is not fulfilled. If, on the other hand, all the items for which the platinum flag value is "1" are acquired, the special item processing unit 410 will convey this inspection result to the special item acquisition condition fulfillment determining unit 202, and the special item acquisition condition fulfillment determining unit 202 will determine that the special item acquisition condition has been fulfilled.

It is to be noted that the special item acquisition condition fulfillment determining unit 202 may have the inspection function performed by the special item processing unit 410. In such a case, the item setting information 130 and the item acquisition information 110 are supplied from the item information supplying unit 406 to the special item acquisition condition fulfillment determining unit 202, and the special item acquisition condition fulfillment determining unit 202 inspects the item acquisition status.

If the acquisition condition set for the platinum trophy is fulfilled, the special item acquisition condition fulfillment determining unit 202 will convey the item ID on the platinum trophy to the special item processing unit 410. The ID value of this item is "0". The special item processing unit 410 acquires the thus notified item ID and generate item acquisition information 110. More specifically, the special item processing unit 410 sets the acquired flag value of the item ID0 to "1" in the trophy acquisition table.

Then, the special item acquisition condition fulfillment determining unit 202 instructs the special item processing unit 410 to convey the item ID "0" to the game software 300. The special item processing unit 410 conveys the item ID "0" of a platinum trophy to the game software 300. Upon receipt of the item ID "0" of the platinum trophy, the game execution unit 302 displays on the game screen a message indicating that the platinum trophy has been acquired. Note that this message may be displayed on the game screen by the system software 200. As the acquisition condition set for the platinum trophy is fulfilled, the message generator 204 receives an instruction from the special item acquisition condition fulfillment determining unit 202, and generates a message concerning the platinum trophy acquisition. The display processing unit 220 displays the thus generated message on a predetermined area within the game screen, while a game is being played, in a superimposed manner. As a result, even if the game software 300 does not display the message concerning the platinum trophy acquisition, the system software 200 will display the message on the game screen in a superimposed manner, so that the use has a chance to check the massage.

In this manner, in the information processing apparatus 10, the game software 300 awards the bronze, silver, and gold trophies to the user as the result of the fulfillment of the mission in the game. Also, in the information processing apparatus 10, the system software 200 awards the platinum trophy to the user as the result of the acquisition of the bronze, silver, and gold trophies. This can create a sense of premium in the platinum trophy. Since the system software 200 performs the process for acquiring the platinum trophy, the processing load of the game software 300 can be reduced and the game developer's burden on the development can also be reduced.

<Process for Displaying the Trophies>

A description is given hereunder of a trophy displaying process. The trophy display process is started when the user enters a request for the display of a trophy from the input device 20. As the receiving unit 230 receives the request for the display of a trophy from the user, the mode setting unit 232 sets the display mode of the trophy. There are "first mode" and "second mode" available in this display mode. As will be discussed later, the trophy screen based on the item acquisition information 120a accumulated by the management server 14 are displayed in the first mode. Also, the trophy screen based on the item acquisition information 110 are displayed in the second mode. That is, in the first mode, information concerning all acquired trophies bound to a user account ID in the management server 14 is presented to the user. Also, in the second mode, information concerning the trophies acquired by the information processing apparatus 10 that the user is currently operating is presented to the user. Note that the "first mode" and the "second mode" are each a display mode with which to determine what is to be displayed on a trophy screen and are irrelevant to whether the information processing apparatus 10 is connected to the network 4 or not, e.g., whether the information processing apparatus 10 is signed in to a trophy browsing service or not at the time of setting the mode.

At the startup of application used to generate a trophy screen (hereinafter referred to as "trophy application"), the mode setting unit 232 sets either the first mode or the second mode in accordance with the screen status at the time the receiving unit 230 has received the display request and/or the status where the displaying process has been terminated previously. In the following, a description is given of each state in which to determine the display mode.

In the trophy browsing service provided by the management server 14, the profile information on users who have singed in to the service is open to the public. This profile information contains general information concerning the acquired trophies in addition to the attribute information on users. Each user can view his/her own profile information and other users' profile information so as compare them. Thus, when the user enters a request for the display of the trophy screen from his/her own profile screen or the other user's profile screen, the user often wishes to view the updated trophy acquisition status. For that reason, as the receiving unit 230 receives the display request through his/her own profile screen or the other users' profile screen, the mode setting unit 232 sets the display mode of the trophy screen to the first mode.

Before the start-up of application, a menu screen where icon images of executable applications are arranged is displayed in the information processing apparatus 10. An icon image of trophy application is also displayed on the menu screen, and an initial screen is produced when this icon image is selected by the user.

Figure 8:
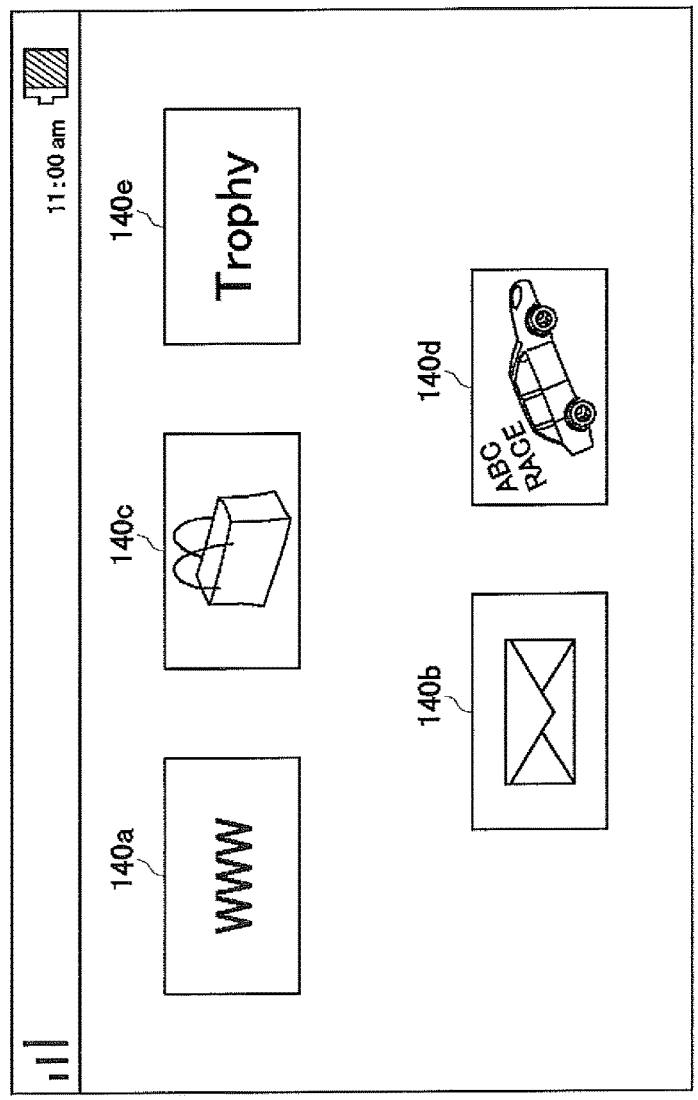
FIG. 8 shows an example of menu screen displayed on a display device.

FIG. 8 shows an example of a menu screen displayed on the display device 68. For example, this menu screen is displayed at power-on of the information processing apparatus 10. The system software 200 generates a menu image where icon images 140a to 140e of executable applications are arranged. The thus generated menu image is displayed on the display device 68 by the display processing unit 220. Each icon image 140 is associated with each application. When the user selects an icon, which he/she wishes to execute, on the menu screen, the environment in which the application identified by the selected icon image 140 is executed is created and now ready for use.

Each icon image 140 is prepared for each application and is preferably prepared by the use of picture and/or text with which the user can recognize the application at first glance. For example, the icon image 140a identifies an application for Web connection, the icon image 140b identifies an application for electronic mail, and the icon image 140c identifies an application for connecting to a virtual shopping mall. The icon image 140d identifies a game tile, and the icon image 140e identifies a trophy application. Note that these applications are only exemplary and other applications may be included.

The user selects the icon image 140 on the menu screen when he/she taps a region where any of icon images 140 is displayed. The tap position is detected by the touch panel 69, the receiving unit 230 receives the detected tap position as the selection operation of the icon image 140. In the information processing apparatus 10 according to the present exemplary embodiment, when the icon image 140 is selected on the menu screen, a display image associated with an application identified by the icon image 140 is produced and then displayed on the display device 68 instead of the application identified thereby being started at once. Hereinafter, this display image will be referred to as "board screen".

Figure 9:
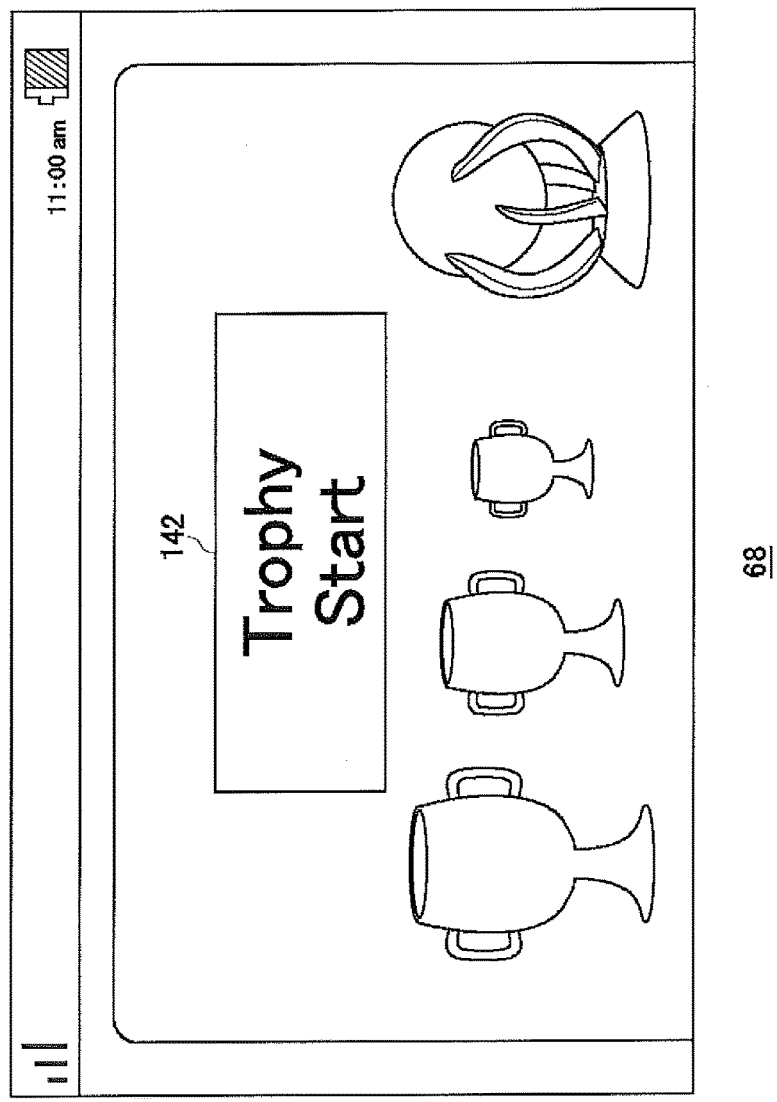
FIG. 9 shows an example of a board screen.

FIG. 9 shows an example of a board screen. The board screen is presented to the user before the start of an application and therefore the board screen plays the role of instructing the user to start the application. Accordingly, the board screen is constituted by including a game start button 142 with which to instruct the start of an application by the user. FIG. 9 shows a board screen when the icon image 140e used to identify the trophy application is selected on the menu screen of FIG. 8. As the user presses down on the start button 142, the receiving unit 230 receives a request for the display of the trophy screen and then the mode setting unit 232 sets the display mode.

The display mode used when the trophy application was terminated last time is stored in the storage 46. At the end of the trophy application, this previous display mode is recorded in a predetermined region of the storage 46 by the mode setting unit 232. If the previous trophy application has ended in the first mode, the mode setting unit 232 will set the display mode of this time's trophy application to the first mode. If, on the other hand, the previous trophy application has ended in the second mode, the mode setting unit 232 will set the display mode of this time's trophy application to the second mode. In this manner, when the trophy application is to be started from the menu screen, the mode setting unit 232 sets the display mode to the display mode used when the previous application was terminated. A user who has previously executed the trophy application in the first mode is more likely to execute the trophy application in the first mode next time as well. Also, a user who has previously executed the trophy application in the second mode is more likely to execute the trophy application in the second mode next time as well. Using these tendencies, the mode setting unit 232 sets the previously-set display mode to the display mode for the next time as well.

As described above, the mode setting unit 232 sets the display mode of this time's trophy application in accordance with the screen status immediately before the start of the trophy application or the display mode at the end of the previous trophy application.

FIG. 9 shows the board screen at the time the icon image used to identify the trophy application is selected on the menu screen (see FIG. 8). If, on the other hand, the icon image 140d is selected on the menu screen, the board screen of "ABC RACE" will be displayed. Provided in a board image of a game is a communication region where information is exchanged among the users and so forth. Messages posted by plural users about the game and messages indicating that the other users have acquired trophies are displayed in this communication region. If a user taps a display region of a message indicating that another different user has acquired a trophy, the mode setting unit 232 may set the display mode to the first mode. If the user acquires a trophy during the play of the game, the mode setting unit 232 may set the display mode to the second mode.

If the mode setting unit 232 sets the first mode, the connection verifying unit 234 will check the current connection status. If the communication unit 404 is not connected to the management server 14, the display processing unit 220 will display on the display device 68 a message dialogue with which to confirm with the user that the connection will now be made. For example, a message indicating that "connection will be made right now" and an OK button are displayed in the dialogue, so that the communication unit 404 can start the connection to the management server 14 when the user taps the OK button. As the connection verifying unit 234 determines that the communication unit 404 is being connected to the management server 14, the message dialogue will not be displayed.

If, in this manner, the mode setting unit 232 sets the first mode, the communication unit 404 will access the management server 14 and then receive the item acquisition information 120 bound to the user account ID from the management server 14. If, however, other users with whom the trophy acquisition status is to be compared are specified, the item acquisition information 120 bound to the other users' account IDs will be received as well. The item information acquiring unit 210 acquires the item acquisition information 120 received by the communication unit 404 and then transfers the item acquisition information 120 to the display processing unit 220. Using the item acquisition information 120, the display processing unit 220 displays the item acquisition status on the display device 68.

Figure 10:
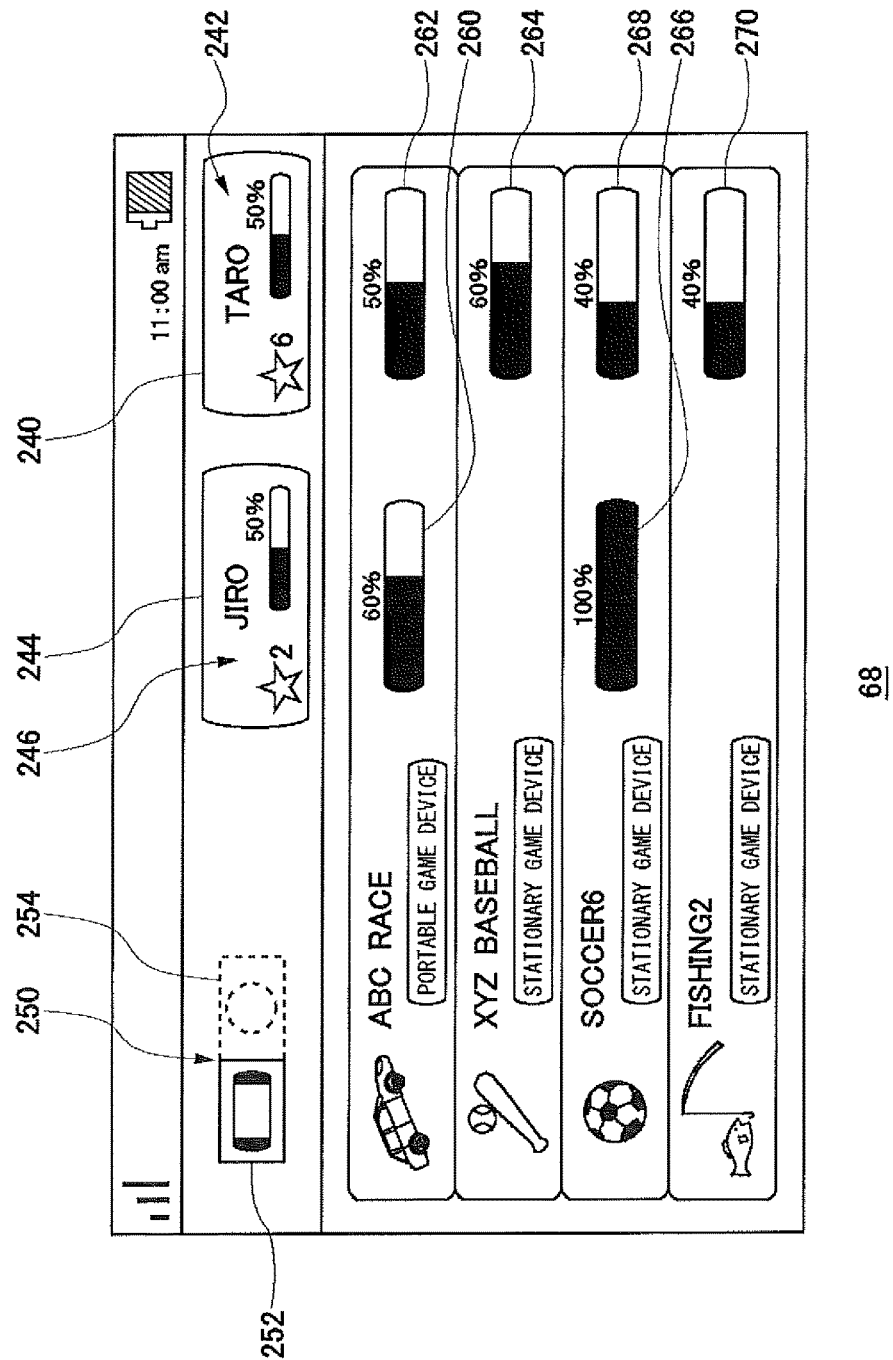
FIG. 10 shows an example of trophy screen displayed in a first mode.

FIG. 10 shows an example of trophy screen displayed in the first mode. The user name is TARO, and a trophy screen compared with the other user JIRO as to the trophy acquisition status is generated in the trophy screen. TARO's level information 242 is displayed on a display region 240, whereas JIRO's level information 246 is displayed in a display region 244.

The display processing unit 220 calculates the earned points using the item acquisition information 120, and derives the user level based on the calculated points. Four kinds of trophies, which are bronze, silver, gold, and platinum trophies, are prepared. The following points are set to the respective trophies.

Bronze: 10 points
Silver: 30 points
Gold: 100 points
Platinum: 200 points

As the earned points increase, the user level increases successively starting from level 1. Assume, for example, that 100 points are one level unit. Then, if the earned points are 650, the display processing unit 220 will derive that the level is "6" and the fulfillment level in level 6 is 50%. The display processing unit 220 calculates the user levels of TARO and JIRO and displays the user levels in the display regions 240 and 244, respectively.

The display processing unit 220 displays the fulfillment levels 260, 262, 264, 266, 268, and 270 for the respective games played by at least one of TARO and JIRO. The display processing unit 220 calculates the earned points using the item acquisition information 120, then calculates the total points using the item setting information 130, and derives the fulfillment level of each game based on the calculated points. The display processing unit 220 calculates the game fulfillment level in such a manner that the earned points are divided by the total points and then the division result is multiplied by 100. It is to be noted here that if no game fulfillment level is displayed, this will mean that the user is not playing the game or the acquired points are not synchronized in the management server 14 even though the game was actually played.

The display processing unit 220 displays on the display device 68 an indicator 250 indicating that either one of the first mode and the second mode is set. In FIG. 10, the indicator 250 is also used as a mode switching button operable by the user. In FIG. 10, a first display button 254 is indicated by a dotted line, which means that the current display mode is the first mode. Also, a second display button 252 is indicated by a solid line, which means that this button is selectable by the user. In the trophy screen of FIG. 10, when the user taps the second display button 252, the mode setting unit 232 switches the display mode to the second mode.

For each game, the display of "portable game device" or "stationary game device" is attached. This indicates the type of a terminal device used most recently by the user (TARO) when the trophy is acquired. For the game entitled "ABC RACE", the trophy is acquired using a portable game device (information processing apparatus 10), whereas, for each of the other games, the trophy is acquired using a stationary game device (information processing apparatus 12). As described above, if the display mode is set to the first mode, the item information acquiring unit 210 will acquire the item acquisition information 120 accumulated in the management server 14 via the communication unit 404, and the display processing unit 220 will display the trophy acquisition status on the display device 68.

If, on the other hand, the display mode is set to the second mode, the item information acquiring unit 210 will acquire the item acquisition information 110 from the storage 46. The display processing unit 220 displays the item acquisition status on the display device 68, using the item acquisition information 110. Where a predetermined requirement is met, the item information acquiring unit 210 may acquire the item acquisition information 110 from the storage 46, after the item acquisition information has been synchronized between the item information acquiring unit 210 and the management server 14 (synchronization process). This applies to a case, for example, where the communication unit 404 is connected to the management server 14 at the start-up of trophy application, and a new trophy is acquired after the item acquisition information has been synchronized between the item information acquiring unit 210 and the management server 14 (synchronization process). The information concerning the date and time when the previous synchronization process was performed and the information concerning the date and time of trophy acquisition are recorded in either one of the recording media. The item information acquiring unit 210 compares the dates and times with each other and thereby determines whether a new trophy is acquired or not, after the previous synchronization process. Whether or not the communication unit 404 is connected to the management server 14 is determined by the connection verifying unit 234.

As the item information acquiring unit 210 recognizes that a new trophy has been acquired after the previous synchronization process and that the communication unit 404 is connected to the management server 14 at the start-up of trophy application, the item information acquiring unit 210 instructs the registration processing unit 402 to perform the synchronization process.

Figure 11:
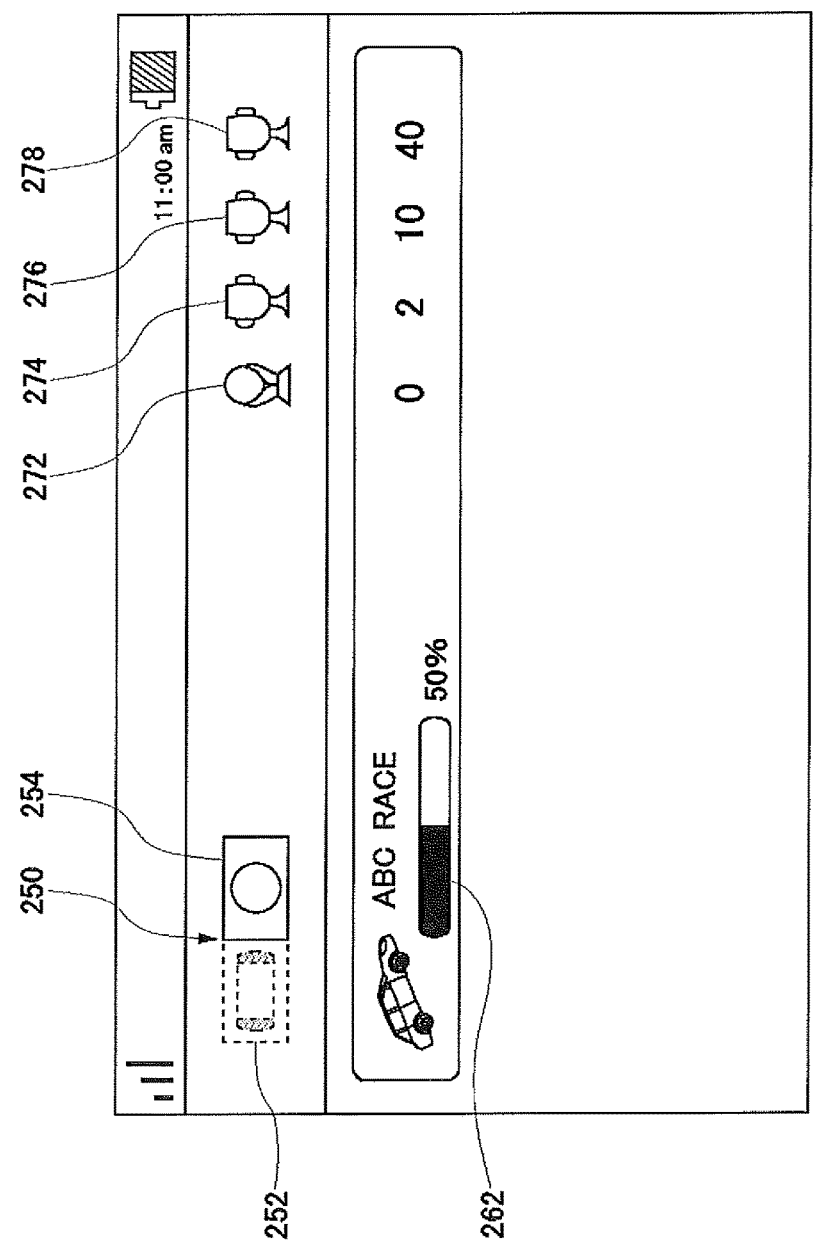
FIG. 11 shows an example of trophy screen displayed in a second mode.

FIG. 11 shows an example of trophy screen displayed in the second mode. The display processing unit 220 generates a trophy screen based on the item acquisition information 110 accumulated in the storage 46. The display processing unit 220 displays the fulfillment level for a game, and displays the respective numbers of platinum trophies 272, gold trophies 274, silver trophies 276, and bronze trophies 278 earned. The method for calculating the game fulfillment level 262 is discussed hereinabove.

The display processing unit 220 display on the display device 68 the indicator 250 indicating that either one of the first mode and the second mode is set. In FIG. 11, the second display button 252 is indicated by a dotted line, which means that the current display mode is the second mode. Also, the first display button 254 is indicated by a solid line, which means that this button is selectable by the user. In the trophy screen of FIG. 11, when the user taps the first display button 254, the mode setting unit 232 switches the display mode to the first mode. As described above, if the display mode is set to the second mode, the item information acquiring unit 210 will acquire the item acquisition information 110 accumulated in the storage 46, and the display processing unit 220 will display the trophy acquisition status on the display device 68.

Figure 12:
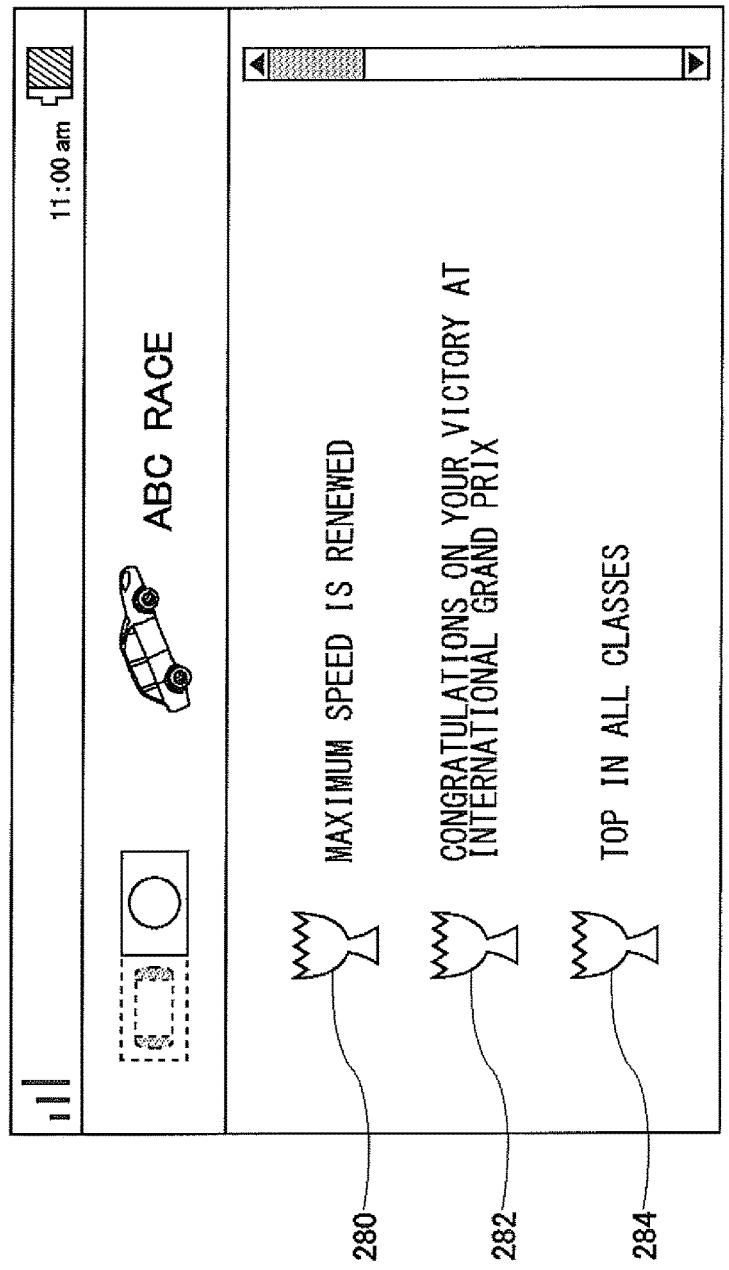
FIG. 12 shows an exemplary screen representing the trophies earned.

FIG. 12 shows an exemplary screen representing the trophies earned. On an acquired-trophy display screen of FIG. 12, the acquired trophies are depicted by trophy images 280, 282, and 284. When a game title region in the trophy screen is tapped, the acquired-trophy display screen is generated by the display processing unit 220.

The trophy images 280, 282, and 284 are included in the item setting information 130 installed in the recording medium 80, and each of these images are any one of bronze, silver, and gold in color. These trophy images 280, 282, 284 are prepared by a game maker, and help express a game world created by the game. The display processing unit 220 generates the acquired-trophy display screen by the use of the trophy images 280, 282, and 284 recorded in the recording medium 80.

Even in a case where the trophy images 280, 282, and 284 are not available at all, the standard images for trophies are recorded beforehand in the storage 46 and therefore the display processing unit 220 can generate the acquired-trophy display screen by the use of these standard images for trophies prepared by default. As described above, the trophy images included in a game file are installed in the recording medium 80 at the start-up of a game by the trophy registration function. However, when the recording medium 80 is replaced by a new recording medium 80, the state where the trophy images of the game are not recorded continues in this newly replaced recording medium 80 before the game is started. As the trophy application is started before the game is started, the trophy images corresponding to the game are not installed in the recording medium 80 and therefore the display processing unit 220 generates an acquired-trophy display screen by the use of the standard images recorded in the storage 46.

In this manner, even if the trophy images 280, 282, and 284 are not installed in the recording medium 80, the display processing unit 220 can generate the acquired-trophy screen by the use of the standard images for trophies recorded in the storage 46. Accordingly, the importance of the item setting information 130 is lower than that of the item acquisition information 110. In the light of this, the important item acquisition information 110 is recorded in the storage 46, and the item setting information 130 is recorded in the recording medium 80.

Figure 13:
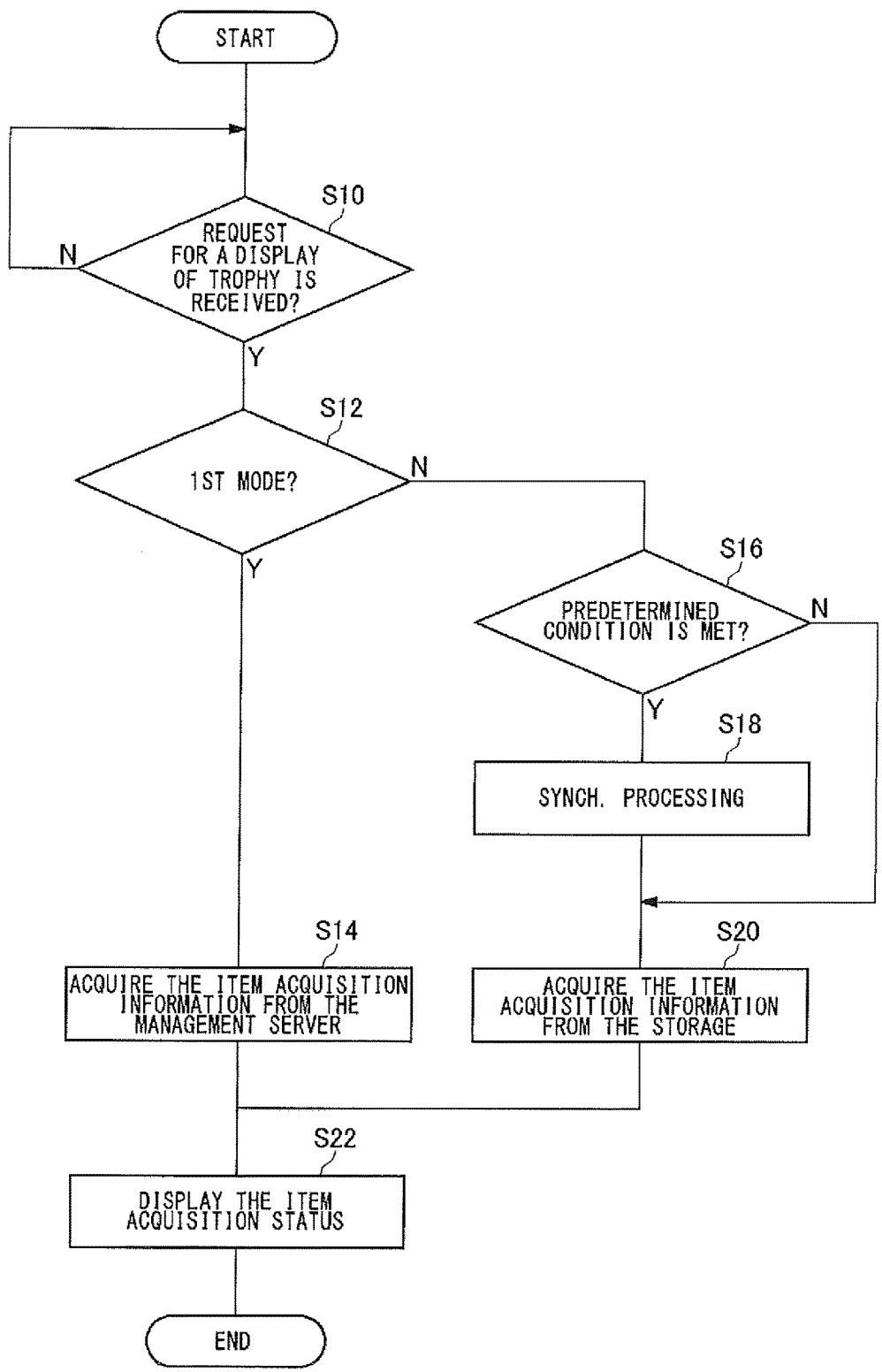
FIG. 13 is a flowchart showing a trophy screen display processing.

FIG. 13 is a flowchart showing a trophy screen display processing. In the flowchart of FIG. 13, the procedure of each structural component is shown using S (the capital letter of "Step"), which means a step, and numbers combined. If, in the flowchart of this specification, a determining process is executed in a processing indicated by the combination of S and a number and if the decision result is positive, "Y" (the capital letter of "Yes") will be appended like "Y of S10". If, on the other hand, the decision result is negative, "N" (the capital letter of "No") will be appended like "N of S10".

The receiving unit 230 monitors the request for a display (N of S10). As the receiving unit 230 receives the display request (Y of S10), the mode setting unit 232 sets the display mode in accordance with the screen status immediately before the start of the trophy application or the display mode at the end of the previous trophy application (S12). As the mode setting unit 232 sets the first mode (Y of S12), the communication unit 404 receives the item acquisition information 120 from the management server 14 and then the item information acquiring unit 210 acquires the item acquisition information 120. The display processing unit 220 generates a trophy screen indicating the trophy acquisition status, based on the item acquisition information 120 (S22).

On the other hand, as the mode setting unit 232 sets the second mode (N of S12), the item information acquiring unit 210 determines whether a predetermined condition is met or not (S16). If a new trophy has been acquired after the previous synchronization process (Y of S16), the item information acquiring unit 210 synchronizes the item acquisition information between the item information acquiring unit 210 and the management server 14 (S18). If the predetermined condition is not met (N of S16), the synchronization process will not be performed. The item information acquiring unit 210 acquires the item acquisition information 110 from the storage 46 (S20) and the display processing unit 220 generates a trophy screen indicating the trophy acquisition status, based on the item acquisition information 110 (S22).

The present invention has been described based upon illustrative exemplary embodiments. The above-described exemplary embodiments are intended to be illustrative only and it will be obvious to those skilled in the art that various modifications to the combination of constituting elements and processes could be developed and that such modifications are also within the scope of the present invention. In the exemplary embodiments, games are cited and implemented as an example of applications but applications other than games may be implemented instead.

The features and characteristics of the present invention described in the exemplary embodiments may be defined by the following Item 1 to Item 7:

Item 1

An information processing apparatus, including:
a receiving section for receiving a first recording medium;
a built-in type second recording medium;
a registration processing unit for acquiring, from an application, item setting information containing at least a plurality of item IDs, with which to identify items acquirable by a user in the application, and an item image and recording the item setting information in a first recording medium; and
an item acquisition processing unit for generating item acquisition information indicating that an item has been acquired, by use of the item ID associated with a preset condition, when the condition preset in the application is fulfilled,
wherein the item acquisition processing unit writes the item acquisition information, generated by the item acquisition processing unit, to the second recording medium.

Item 2

An information processing apparatus according to Item 1, wherein, at an initial start-up of the application, the registration processing unit generates in the second recording medium a table where the plurality of item IDs are associated with flag values indicating that an item or items is/are not acquired, and
wherein the item acquisition processing unit writes the item acquisition information to the second recording medium in such a manner the flag value in the table is changed to a flag value indicating the item has been acquired.

Item 3

An information processing apparatus according to Item 1 or Item 2, wherein, at each start-up of the application, the registration processing unit checks to see if the item setting information is recorded in the first recording medium, and
when the item setting information is not recorded, the registration processing unit acquires the item setting information from the application and records the acquired item setting information to the first recording medium.

Item 4

An information processing apparatus according to any one of Item 1 to Item 3, further including a display processing unit for generating an item screen including one or more item images,
wherein, when the item setting information is recorded in the first recording medium, the display processing unit generates the item screen by use of the item image recorded in the first recording medium, and
when the item setting information is not recorded in the first recording medium, the display processing unit generates the item screen by use of an item standard image.

Item 5

An information processing apparatus according to Item 4, wherein the item reference image is recorded in the second recording medium.

Item 6

A program embedded in a non-transitory computer-readable medium, the program including:
a registration processing module operative to acquire, from an application, item setting information containing at least a plurality of item IDs, with which to identify items acquirable by a user in the application, and an item image and operative to record the item setting information in a first recording medium of removable type; and
an item acquisition processing module operative to generate item acquisition information indicating that an item has been acquired, by use of the item ID associated with a preset condition which has been fulfilled, when the condition preset in the application is fulfilled, and operative to record the item acquisition information in a second recording medium of built-in type.

Item 7

A non-transitory computer-readable medium encoded with a program, executable by a computer, according to Item 6.

What is claimed is:

1. An information processing apparatus which is operated by a user, the apparatus comprising a central processing unit and a non-transitory computer readable storage medium containing a computer program, which when executed by the central processing unit causes the information processing apparatus to carry out actions, comprising:
setting a display mode as a first mode or a second mode and switching between the first mode and the second mode in response to user instruction;

facilitating communications over a network with an external server;

recording item acquisition information in a recording medium of the information processing apparatus, the item acquisition information including one or more achievements of the user acquired during gameplay of one or more game applications that have been executed on the information processing apparatus;

acquiring item acquisition information of the user, wherein, when the first mode is set, the acquiring step includes acquiring the item acquisition information of the user stored in the external server via the communicating step, which includes: (i) item acquisition information achieved by the user during gameplay of the one or more game applications on the information processing apparatus, and (ii) item acquisition information achieved by the user during gameplay of the one or more game applications on one or more other information processing apparatus, and wherein, when the second mode is set, the acquiring step includes acquiring the item acquisition information only from the recording medium of the information processing apparatus; and producing item acquisition status for display using the item acquisition information acquired, wherein, when the first mode is set, the item acquisition information of the user acquired from the external server via the communication unit is displayed, which includes simultaneously displaying: (i) the item acquisition information achieved by the user during gameplay of the one or more game applications on the information processing apparatus, and (ii) the item acquisition information achieved by the user during gameplay of the one or more game applications on one or more other information processing apparatus, wherein, when the second mode is set, the item acquisition information acquired from the recording medium and achieved by the user during gameplay of the one or more game applications on the information processing apparatus is displayed while the information processing apparatus is not in communication with the external server, wherein an indicator is produced for displaying on the display, the indicator indicating whether the first mode or the second mode is set, and wherein the indicator is produced as a mode switching button operable by a user.

2. An information processing apparatus according to claim 1, further comprising recording in the recording medium the item acquisition information acquired from the external server for registering.

3. An information processing apparatus according to claim 2, wherein information with which to identify an application that was executed in the past by the information processing apparatus is recorded in the recording medium, wherein, when the second mode is set as the display mode and when communicating with the external server, the item acquisition information on the application that was executed in the past is acquired from the external server via the communicating step, and wherein the registering includes recording in the recording medium the item acquisition information acquired.

4. A non-transitory computer-readable medium containing a program, the program for execution on an information processing apparatus which is operated by a user, the program causing the information processing apparatus to carry out actions, comprising:

setting a display mode as a first mode or a second mode and switching between the first mode and the second mode in response to user instruction;

facilitating communications over a network with an external server;

recording item acquisition information in a recording medium of the information processing apparatus, the item acquisition information including one or more achievements of the user acquired during gameplay of one or more game applications that have been executed on the information processing apparatus;

acquiring item acquisition information of the user, wherein, when the first mode is set, the acquiring step includes acquiring the item acquisition information of the user stored in the external server via the communicating step, which includes: (i) item acquisition information achieved by the user during gameplay of the one or more game applications on the information processing apparatus, and (ii) item acquisition information achieved by the user during gameplay of the one or more game applications on one or more other information processing apparatus, and wherein, when the second mode is set, the acquiring step includes acquiring the item acquisition information only from the recording medium of the information processing apparatus; and producing item acquisition status for display using the item acquisition information acquired, wherein, when the first mode is set, the item acquisition information of the user acquired from the external server via the communication unit is displayed, which includes simultaneously displaying: (i) the item acquisition information achieved by the user during gameplay of the one or more game applications on the information processing apparatus, and (ii) the item acquisition information achieved by the user during gameplay of the one or more game applications on one or more other information processing apparatus, wherein, when the second mode is set, the item acquisition information acquired from the recording medium and achieved by the user during gameplay of the one or more game applications on the information processing apparatus is displayed while the information processing apparatus is not in communication with the external server, wherein an indicator is produced for displaying on the display, the indicator indicating whether the first mode or the second mode is set, and wherein the indicator is produced as a mode switching button operable by a user.

5. A computer comprising a central processing unit and a non-transitory computer readable storage medium, operating under the control of a computer program, which causes the computer to operate as an information processing apparatus and to carry out actions, comprising:

setting a display mode as a first mode or a second mode and switching between the first mode and the second mode in response to user instruction;

facilitating communications over a network with an external server;

recording item acquisition information in a recording medium of the information processing apparatus, the item acquisition information including one or more achievements of the user acquired during gameplay of one or more game applications that have been executed on the information processing apparatus;

acquiring item acquisition information of the user, wherein, when the first mode is set, the acquiring step includes acquiring the item acquisition information of the user stored in the external server via the communicating step, which includes: (i) item acquisition information achieved by the user during gameplay of the one or more game applications on the information processing apparatus, and (ii) item acquisition information achieved by the user during gameplay of the one or more game applications on one or more other information processing apparatus, and wherein, when the second mode is set, the acquiring step includes acquiring the item acquisition information only from the recording medium of the information processing apparatus; and producing item acquisition status for display using the item acquisition information acquired, wherein, when the first mode is set, the item acquisition information of the user acquired from the external server via the communication unit is displayed, which includes simultaneously displaying: (i) the item acquisition information achieved by the user during gameplay of the one or more game applications on the information processing apparatus, and (ii) the item acquisition information achieved by the user during gameplay of the one or more game applications on one or more other information processing apparatus, wherein, when the second mode is set, the item acquisition information acquired from the recording medium and achieved by the user during gameplay of the one or more game applications on the information processing apparatus is displayed while the information processing apparatus is not in communication with the external server, wherein an indicator is produced for displaying on the display, the indicator indicating whether the first mode or the second mode is set, and wherein the indicator is produced as a mode switching button operable by a user.

* * * * *